Dec. 6, 1966  E. R. LIVINGSTON ETAL  3,289,849
ADJUSTABLE STRAINER
Filed Jan. 13, 1964

INVENTORS
ELMER R. LIVINGSTON
REX TAYLOR
BY Fulwider, Patton, Rieber, Lee, and Utecht
ATTORNEYS United States Patent Office 3,289,849
Patented Dec. 6, 1966

3,289,849
ADJUSTABLE STRAINER
Elmer R. Livingston, 5101 Sherbourne Drive, and Rex Taylor, 4446 Finley Ave., both of Los Angeles, Calif.
Filed Jan. 13, 1964, Ser. No. 337,411
10 Claims. (Cl. 210—469)

The present invention relates to an adjustable strainer adapted to be temporarily mounted on top of cooking utensils, pans and the like containers, to facilitate the pouring off of liquids while retaining solids within the container.

In the separation of liquids from solids in a cooking utensil or similar container it is desirable to have a temporarily secured to the top of the container to be supported thereby against involuntary removal while the liquids are being poured from the container and the solids retained therein. It is further desirable that the strainer surface be substantially flat to engage the upper edge of the pan in the poring area without substantial gaps therebetween through which solids could escape during the liquid pour.

The strainer according to the present invention is of light weight and economical construction, but is self maintained in a substantially flat plane so that it will remain in contact with the edge of the container to which it is temporarily attached. To secure this flat construction against warpage the structural edges of the strainer are not only provided with reinforcing ridges, channels or curved offsets which may be formed by major indentations from the general plane of the strainer, but the material adjacent the edge of the offset or indentation is desirably upset or displaced in a fine pencil-line-like groove. The curved offset and indentation serve to strengthen and reinforce the strainer against bending and the upset groove renders its surface truly planar and inhibits warping by apparently removing or lessening the internal stresses which may be placed therein by the indenting or offsetting operation.

The strainer according to the present invention automatically adjusts to various sizes of container tops and may be readily securely attached to and removed from a container top by a one-hand operation, thereby permitting the container to be held by one hand while the other attaches and removes the strainer.

It is therefore an object of the present invention to provide an improved strainer for temporary attachment to a container opening.

Another object of this invention is the provision of an improved adjustable strainer for temporary attachment to a container top, in which warping is inhibited and the strainer engages the edge of the container without substantial gaps therebetween.

A further object of this invention is the provision of an improved strainer cover for temporary attachment to a container which is readily adjustable to container tops of various sizes and may be securely attached and detached by one-hand operation.

Yet another object of this invention is the provision of an improved, light-weight, economical, strong and flat strainer plate for temporary attachment to the top of a container for pouring liquids therefrom while retaining solids therein.

These and other objects and features of the invention will be readily apparent to those skilled in the art from the following specification and the appended drawing, in which.

Figure 1:
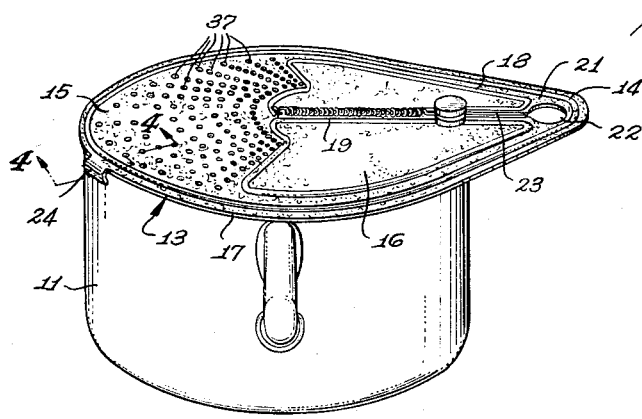
FIGURE 1 is a perspective view of a cooking utensil with a strainer according to the present invention temporarily attached thereto as a cover.
Figure 2:
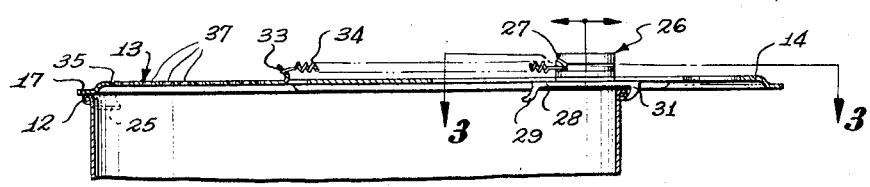
FIGURE 2 is a partial vertical sectional view through the utensil and strainer of FIGURE 1.

In the drawings, a strainer 13 according to the present invention is shown temporarily attached as a straining cover to a conventional, open-top, cooking utensil 11 having the usual rolled edge 12 around its top to which the strainer is temporarily but securely attached for the liquid pouring operation. The strainer 13 is formed of thin sheet metal, generally circular in shape over is major portion, but having a rearwardly extending gripping end 14 generally diametrically opposite a forward straining portion 15. The main plane of the strainer is provided by an imperforate central portion 16 and a peripheral flange 17. From this plane are drawn the perforated forward strainer portion 15, a generally peripherally disposed channel 18 betwen the central portion 16 and the edge portion 17, and a generally diametrically extending channel 19 leading from the perforated strainer portion 15 to the back end of the strainer where it joins with the channel 18 to form an enlarged, roughly circular portion 21. Through the portion 21 is punched a round hole 22 and the rear portion of the channel 19 is provided with a central slot 23 communicating with the hole 22.

Figure 4:
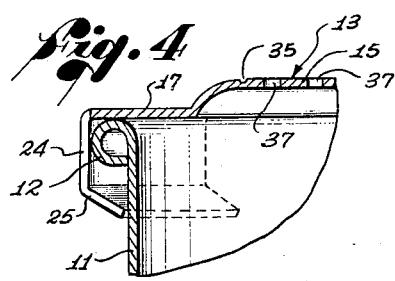
FIGURE 4 is a detailed sectional view on the line 4—4 of FIGURE 1.
Figure 3:
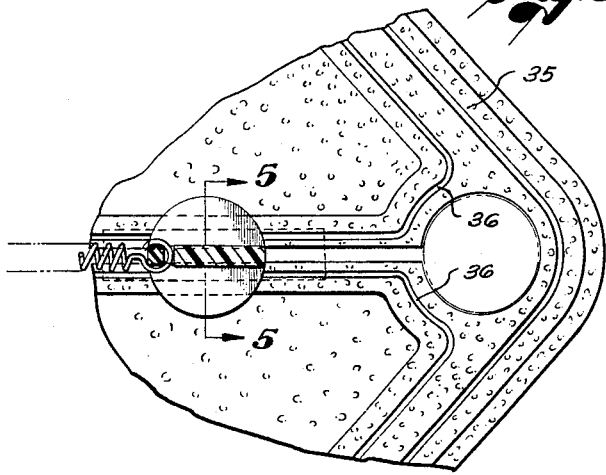
FIGURE 3 is a top plan view of the rear portion of the strainer, remote from the straining openings therethrough.

At its forward edge the strainer is provided with a pair of spaced legs 24 which depend from the edge portion 17 thereat, as shown in FIGURES 1 and 4. The legs 24 preferably have inwardly bent ends 25 which are disposed under the rolled edge 12 of the utensil, in the attached position of the strainer, and prevent the separation of the strainer from the utensil by a simple sliding movement of the legs 24 axially of the utensil.

Slidably mounted within the slot 23 is a slider 26 having a round upper portion 27 passing freely through the hole 22 and an integral, lower, strip portion 28 having forwardly directed hook-like elements 29 and 31 depending from its ends. The round portion 27 and the strip 28 are joined by a narrow elongated neck 32 disposed and riding in the slot 23 so that the edges of the channel 19 at opposite sides of the slot 23 are received in notches provided between the upper, round portion 27 and the lower strip 28 of the slider 26. By the provision of the pair of hook-like elements 29 and 31 the range of sizes of pans upon which the strainer can be adjustably fitted is greatly increased. It will also be noted that the channel 19 provides a guide-way for the slider 26 as well as serving as a strengthening rib which permits the use of relatively light-weight and economical sheet metal.

Figure 5:
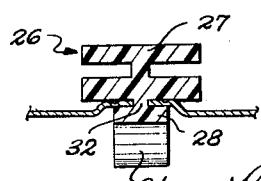
FIGURE 5 is a detailed sectional view on the line 5—5 of FIGURE 3.

A tab 33 is bent upwardly from the strainer surface adjacent the end of the channel 19 and a tension spring 34 is disposed between the tab 33 and the slider 26 to bias the slider forwardly. The slider 26 may be formed of molded plastic material and is readily assembled on the strainer by passing the round portion 27 through the hole 22 and guiding the neck 32 forwardly into the slot 23, as shown in FIGURE 5.

The front legs 24 are desirably spaced evenly from the diametrical line of the slot 23 so that, with one of the hook members 29, 31 engaging the opposite edge of the utensil, a secure three-point attachment of the strainer to the utensil top is provided.

It has been found that the operation of drawing the channels 18 and 19 and the strainer portion 15 from the main plane of the metal sheet from which the strainer is formed may set up internal stresses which can cause random warping of the strainer out of a flat plane. To prevent such warping, the metal of the strainer adjacent the curvatures of the draw on one face is displaced to form indented fine grooves 35 and 36. This relieves the internal warping stresses and results in a strong, flat structure for the strainer. The grooves at 35 follow the outer curved draw forming the channel 18 and the strainer portion 15, and at 36 follow the inner curved draws of channels 18 and 19 and portion 15.

The forward portion 15 of the strainer is provided with a multiplicity of holes 37 therethrough of a size to permit the free flow of liquid while retaining the solid material in the utensil.

The strainer of this invention may be readily attached to and removed from the utensil by one hand, thus permitting the other hand to hold the utensil itself. To remove the strainer from the attached position of the drawing, the back end 14 is grasped and pushed bodily forward in the plane of the strainer to move the legs 24 away from the utensil edge until the ends 25 are clear thereof. Thereupon the strainer can be tilted upwardly about the engagement of the hook member 31 with the utensil edge until the ends 25 clear the upper edge of the utensil, whereupon the strainer may be bodily retracted in a rearward direction and separated from the utensil.

The attaching operation is the reverse of that described. Depending on the size of the utensil top, one or the other of the hook members 29, 31 is engaged with the edge of the utensil and the main body of the strainer is moved forwardly with the legs 24 held above the utensil edge, the slider 26 remaining stationary and the channel 19 moving therealong. When the ends 25 of the legs 24 clear the forward edge of the container, the strainer is tilted downwardly about the hook members 29, 31 until the forward part of the edge 17 of the strainer engages the top of the utensil, whereupon the strainer is gradually released to move rearwardly under the bias of spring 34 to bring the attaching legs 24 into the position of FIGURE 4, with their ends 25 beneath the rolled edge 12 of the utensil. The liquid may now be readily poured from the utensil by tilting thereof while the strainer remains securely attached to the top of the utensil at the legs 24 and hook members 29, 31.

While a certain preferred embodiment of the invention has been specifically illustrated and described, it will be understood that the invention is not limited thereto as many variations will be apparent to those skilled in the art and the invention is to be given its broadest interpretation within the terms of the following claims.

We claim:

1. An adjustable strainer for attachment to the top of a container comprising: a substantially flat sheet metal plate of a size to completely cover a container top in substantial engagement with substantially the entire top edge thereof; a slot in said plate directed toward the forward and back portions thereof and disposed generally centrally between the opposite sides of the plate; means on the forward end of the strainer plate adapted to releasably interlock with the top edge of a container; means slidably mounted in said slot adapted to releasably interlock with the top edge of the container at the side opposite to the side engaged by said forward end means, the interlock between the slidable means and the container not extending beyond the strainer edge; means biasing said slidable means forwardly of the strainer plate; and a plurality of straining perforations through at least the forward portion of said strainer plate, said strainer plate being mountable to entirely cover a container top by being clamped thereon between the means interlocking with the top edge at opposite sides thereof, under the bias of said slidable means.

2. The adjustable strainer defined in claim 1 in which the interlocking means on the forward end of the strainer plate comprises: a pair of legs spaced apart equidistant from the perpendicular plane in which slot lies and providing, with the interlocking means on the slidable means, a three-point attachment for the strainer plate holding it against involuntary separation from a container on which it is mounted.

3. An adjustable strainer for attachment to the top of a container comprising: a substantially flat sheet metal plate having a circular outline over the forward portion thereof; a diametrically disposed slot in said plate directed toward the forward and back portions thereof, the forward and back portions of said plate being sized to completely cover a container top in substantial engagement with substantially the entire top edge thereof; means on the forward end of the strainer plate adapted to releasably interlock with the top edge of a container; means slidably mounted in said slot adapted to releasably interlock with the top edge of the container at the side opposite to the side interlocked with the forward end means, the interlock between the slidable means and the container not extending beyond the strainer edge; means biasing said slidable means forwardly of the strainer plate; and a plurality of straining perforations through at least the forward portion of said strainer plate, said strainer plate being adapted to entirely cover a container top by being clamped thereon between the means interlocking with the top edge at opposite sides thereof, under the bias of said slidable means.

4. An adjustable strainer as defined in claim 3 in which the back portion of the plate extends beyond the part thereof adapted to cover the container top to form a handle for manipulation of the strainer, said handle portion having an opening therethrough communicating with said slot through which said slidable means is mounted in the slot without otherwise opening the slot, said opening further providing means for hanging the strainer from a support.

5. An adjustable strainer for attachment to the top of a container comprising: a substantially flat sheet metal plate of a size to completely cover a container top in substantial engagement with substantially the entire top edge thereof; a slot in said plate directed toward the forward and back portions thereof and disposed generally centrally between the opposite sides of the plate; means on the forward end of the strainer plate adapted to releasably interlock with the top edge of a container; means slidably mounted in said slot adapted to releasably interlock with the top edge of the container at the side opposite to the side interlocked with the forward end means, the interlock between the slidable means and the container not extending beyond the strainer edge; means biasing said slidable means forwardly of the strainer plate; a plurality of straining perforations through at least the forward portion of said strainer plate, said strainer plate being adapted to entirely cover a container top by being clamped thereon between the means interlocking with the top edge at opposite sides thereof, under the bias of said slidable means; curved draw surfaces pressed from the original plane of said strainer plate to provide stiffening therefor against bending; and a narrow groove extending adjacent said curved draw surface and formed by displacing the adjacent metal to relieve internal stresses in the strainer plate and inhibit warping thereof.

6. An adjustable strainer for attachment to the top of a container comprising: a substantially flat sheet metal plate of a size to completely cover a container top in substantial engagement with substantially the entire top edge thereof having a circular outline over the forward portion thereof; a diametrically disposed slot in said plate directed toward the forward and back portions thereof; means on the forward end of the strainer plate adapted to releasably interlock with the top edge of a container; means slidably mounted in said slot adapted to releasably interlock with the top edge of the container at the side opposite to the side interlocked with the forward end means, the interlock between the slidable means and the container not extending beyond the strainer edge; means biasing said slidable means forwardly of the strainer plate; a plurality of straining perforations through at least the forward portion of said strainer plate, said strainer plate being adapted to entirely cover a container top by being clamped thereon between the means interlocking with the top edge at opposite sides thereof under the bias of said slidable means, the forward, perforated portion of the strainer being drawn a small distance above the original plane of the strainer plate; and a drawn channel extending around the strainer plate adjacent the side and rear edges thereof and communicating with said forward drawn portion whereby to stiffen the strainer plate against bending.

7. An adjustable strainer for attachment to the top of a container comprising: a substantially flat sheet metal plate having a circular outline over the forward portion thereof; a diametrically disposed slot in said plate directed toward the forward and back portions thereof, the forward and back portions of said plate being sized to completely cover a container top in substantial engagement with substantially the entire top edge thereof; means on the forward end of the strainer plate adapted to releasably interlock with the top edge of a container; means slidably mounted in said slot adapted to releasably interlock with the top edge of the container at the side opposite to the side interlocked with the forward end means, the interlock between the slidable means and the container not extending beyond the strainer edge; means biasing said slidable means forwardly of the strainer plate; a plurality of straining perforations through at least the forward portion of said strainer plate, said strainer plate being adapted to entirely cover a container top by being clamped thereon between the means interlocking with the top edge at opposite sides thereof under the bias of said slidable means, the forward perforated portion of the strainer being drawn a small distance above the original plane of the strainer plate; a drawn channel extending around the strainer plate adjacent the side and rear edges thereof and communicating with said forward drawn portion whereby to stiffen the strainer plate against bending; and narrow grooves extending adjacent the edges of the drawn portions and formed by displacing the metal of the plate thereat to relieve internal stresses formed in the drawing operation to inhibit warping of the plate.

8. An adjustable strainer for attachment to the top of a container comprising: a substantially flat sheet metal plate of a size to completely cover a container top in substantial engagement with substantially the entire top edge thereof; a slot in said plate directed toward the forward and back portions thereof and disposed generally centrally between the opposite sides of the plate; means on the forward end of the strainer plate adapted to releasably interlock with the top edge of a container; means slidably mounted in said slot adapted to releasably interlock with the top edge of the container at the side opposite to the side engaged by said forward end means, the interlock between the slidable means and the container not extending beyond the strainer edge; means biasing said slidable means forwardly of the strainer plate; and a plurality of straining perforations through at least the forward portion of said strainer plate, said strainer plate being mountable to entirely cover a container top by being clamped thereon between the means interlocking with the top edge at opposite sides thereof, under the bias of said slidable means, said slidable means having large upper and lower portions disposed above and below the strainer plate and a narrow neck connecting said portions and disposed in said slot to mount the slidable means on the strainer plate.

9. An adjustable strainer attachment to the top of a container comprising: a substantially flat sheet metal plate of a size to completely cover a container top in substantial engagement with substantially the entire top edge thereof; a slot in said plate directed toward the forward and back portions thereof and disposed generally centrally between the opposite sides of the plate; means on the forward end of the strainer plate adapted to releasably interlock with the top edge of a container; means slidably mounted in said slot adapted to releasably interlock with the top edge of the container at the side opposite to the side engaged by said forward end means, the interlock between the slidable means and the container not extending beyond the strainer edge; means biasing said slidable means forwardly of the strainer plate; a plurality of straining perforations through at least the forward portion of said strainer plate, said strainer plate being mountable to entirely cover a container top by being clamped thereon between the means interlocking with the top edge at opposite sides thereof, under the bias of said slidable means, said slidable means having large upper and lower portions disposed above and below the strainer plate and a narrow neck connecting said portions and disposed in said slot to mount the slidable means on the strainer plate; and a large opening through said strainer plate at the back end of said slot of a size to pass at least one of the upper and lower portions of the slidable means, whereby it may be assembled and disassembled with the strainer plate, the back end of said plate extending beyond the portion thereof adapted to cover a container to provide a handle for the plate and to receive said large opening therein.

10. An adjustable strainer for attachment to the top of a container comprising: a substantially flat sheet metal plate of a size to completely cover a container top in substantial engagement with substantially the entire top edge thereof; a slot in said plate directed toward the forward and back portions thereof and disposed generally centrally between the opposite sides of the plate; means on the forward end of the strainer plate adapted to releasably interlock with the top edge of a container; means slidably mounted in said slot adapted to releasably interlock with the top edge of the container at the side opposite to the side engaged by said forward end means, the interlock between the slidable means and the container not extending beyond the strainer edge; means biasing said slidable means forwardly of the strainer plate; and a plurality of straining perforations through at least the forward portion of said strainer plate, said strainer plate being mountable to entirely cover a container top by being clamped thereon between the means interlocking with the top edge at opposite sides thereof, under the bias of said slidable means, the container edge interlocking means on said slidable means comprising a plurality of depending fingers spaced forwardly and rearwardly of the strainer plate for adjustable interlocking engagement with the edges of containers of different size.

References Cited by the Examiner

UNITED STATES PATENTS

| 1,241,448 | 9/1917 | Sherman | 210—469 |
| 1,328,558 | 1/1920 | Brooks | 210—469 |
| 1,953,338 | 4/1934 | Claire | 210—469 |
| 2,463,209 | 3/1949 | Serkes | 210—469 |

FOREIGN PATENTS

| 756,501 | 9/1956 | Great Britain. |

REUBEN FRIEDMAN, *Primary Examiner.*

C. M. DITLOW, *Assistant examiner.*